United States Patent Office 3,551,166
Patented Dec. 29, 1970

3,551,166
PROCESS FOR THE PREPARATION OF
DRY CULINARY MIXES
Willi Baum, Dusseldorf, and Jürgen Sommer, Dusseldorf-Holthausen, Germany, assignors to Henkel & Cie, G.m.b.H., Dusseldorf-Holthausen, Germany, a corporation of Germany
Filed Oct. 11, 1965, Ser. No. 494,731
Claims priority, application Germany, Oct. 23, 1964,
H 54,116
Int. Cl. A21d 2/00; A23l 1/00
U.S. Cl. 99—94                                        6 Claims

ABSTRACT OF THE DISCLOSURE

A free-flowing dry culinary mix is prepared by spraying finely divided melted shortening into a falling shower of a dry mixture of flour and shortening whereby the dry mixture envelop individual droplets of shortening and form discrete particles of dry culinary mix.

PRIOR ART

Figure 1:
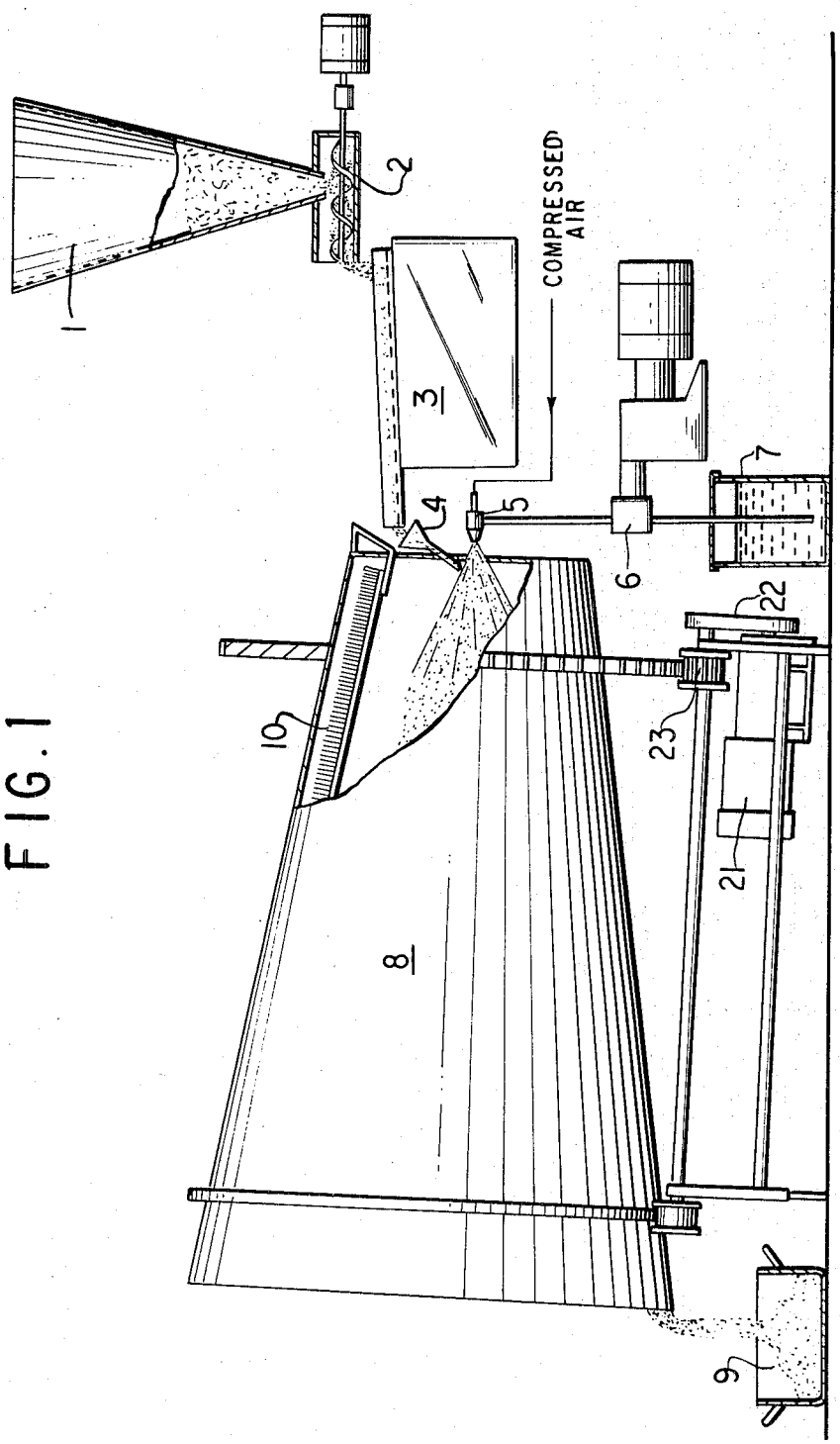

In the preparation of ready-to-use dry baking mixes the addition of the shortening component to the dry powdered ingredients presents the main difficulty. For this purpose the shortening has heretofore been worked into the powdered ingredients by means of mixing devices with a kneading, rotating or grinding action. In this manner the shortening is enveloped by the powdery ingredients and thus loses its tackiness. However, the dry mix obtained thereby is relatively non-homogeneous and has the disadvantage that during prolonged storage part of the shortening migrates to the surface of the individual particles which make up the dry mix, as the result of which the mix tends to cake.

In order to overcome this defect, it has already been tried to atomize super-cooled liquid shortening into the dry ingredients while the latter are kept in constant motion by means of a rotating drum (U.S. Pat. No. 2,835,-588). According to another known process, heated normally solid shortening is sprayed onto the possibly cooled powdered ingredients which are being tumbled in a revolving cylinder (French Pat. No. 1,348,498).

However, even according to the two last-mentioned processes, dry baking mixes are obtained which gradually lose their dry, free-flowing consistency and cake together into larger agglomerates during storage. This disadvantage is in this case also due to migration of the shortening. This fact can be clearly demonstrated in simple fashion, as described in the following paragraph:

A sample of the dry mix to be tested is filled into a funnel having an inlet diameter of about 8–10 cm. (the size of the funnel is immaterial) and compressed so compactly that a cohesive cone is formed which does not fall apart when the funnel is inverted. This cone is placed on absorbent paper (filter paper) and is allowed to stand in this position either at room temperature or at constant temperature for some time. Depending upon the type, amount and distribution of the shortening in the mix, a more or less large portion of the shortening migrates into the paper base and forms there a clearly visible ring around the cone. By impregnating the paper with a fat-soluble dye, such as Sudan blue, the fat ring becomes exceptionally clearly visible. In comparative tests the size of this fat ring is a measure of the capability of the culinary mix to preserve its free-flowing consistency during storage. Moreover, this method conveys information regarding the degree of distribution of the shortening in the mixture of powdered ingredients. An irregular shape of the ring indicates an irregular distribution of the shortening. In the most favorable case no shortening bleeds into the paper, even over prolonged periods of standing.

Upon investigation according to the simple test method it was found that dry culinary mixes prepared according to known processes exhibit a permanent dry consistency only when the shortening content was less than 15% by weight based on the total weight of the dry mix, or when a shortening was used which had a melting point above the normal human body temperature. However, as is well known, the latter is undesirable for the preparation of dry culinary mixes.

OBJECTS OF THE INVENTION

It is an object of the present invention to provide an improved process for the preparation of dry culinary mixes comprising shortening and dry powdered ingredients including flour.

Another object of the instant invention is to provide an improved process for incorporating shortening into the dry powdered ingredients of dry culinary mixes, whereby the finished dry mix will retain its free-flowing, homogeneous characteristics over long periods of storage.

Still another object of the present invention is to provide an improved process for the preparation of dry culinary mixes comprising up to 30% by weight of a shortening having a melting point below normal human body temperature.

Still further objects and advantages of the instant invention will become apparent as the description thereof proceeds.

THE INVENTION

The above objects and advantages are achieved in accordance with the present invention by atomizing melted, normally solid shortening into a shower of particles of a homogeneous mixture of the powdered ingredients in free or delayed gravitational fall.

With a view toward the above-mentioned aspects, it is preferred to use a shortening which has a melting point below normal human body temperature, in particular between 30 and 35° C. The amount of shortening is generally between 5 and 30% by weight, based on the total weight of the dry culinary mix; depending upon the taste of the ultimate consumer, about 15 to 25% by weight of shortening is preferred. For yeast dought the amount of shortening is, of course, less and lies between about 5 and 15%. Examples of suitable shortenings are hydrogenated peanut oil, hydrogenated coconut oil, hydrogenated soybean oil, hydrogenated whale oil, and mixtures of whale oil and palm oil. Other fats modified according to various known methods, which melt within the indicated range, are also suitable as shortenings.

The powdered ingredients consist mostly of flour and sugar. Fine grade wheat flour is preferably used as the flour component. To improve the absorbency of the mixture of powdered ingredients for the atomized shortening, a certain portion of the flour is advantageously replaced by starch, particularly corn starch. In consideration of taste and consistency of the baked products, the amount of starch should, however, not exceed about 30% by weight of the total dry mix. As a rule, it is between 10 and 20% by weight.

Furthermore, with a view toward satisfactory absorbent properties of the mixture of powdered ingredients comprising sugar, it is advantageous to provide part of the sugar in the form of powdered or confectioner's sugar and the remaining amount as finely ground crystalline sugar. Due to the lesser sweetening strength of the confectioner's sugar, however, it is advisable to provide no more than 60% by weight of the required amount of sugar in the form of confectioner's sugar. Usually, the amount of confectioner's sugar is between 30 and 50% by weight of the total required amount of sugar. The total required amount of sugar depends on the taste of the consumer and on the particular recipe and ranges usually between 15 and 35% by weight of the total weight of the dry mix. Of course, according to the process of the invention, sugar-free dry culinary mixes for salty baked products may also be prepared.

Besides flour, sugar and starch, the dry mix may also contain other powdered ingredients, such as powdered egg, powdered milk, baking powder and salt. Furthermore, flavoring agents may be added to these ingredients, if so desired.

It is well known that the flour, which in most cases represents the major ingredients of the mixture of powdered ingredients, tends to form agglomerates. Therefore, it is advantageous to provide the mixture of the powdered ingredients in a fashion such that it comes in contact with the atomized shortening in as finely divided a form as possible. For this purpose the mixture of powdered ingredients may, for example, be passed through a vibrating screen or in smaller plants through a vibrating trough. It is further advantageous to adapt the shape of the shower of particles of the mixture of powdered ingredients descending under the influence of free or delayed gravitational fall to the shape of the spray of atomized shortening. This adaptation is especially easy when a vibrating screen is used. In many cases pneumatic means of feeding the mixture of powdered ingredients to the spray of atomized shortening are of advantage, particularly for the preparation of large quantities of dry culinary mixes.

Furthermore, it is advantageous to subject the dry culinary mix to an after-treatment following the admixture with the atomized shortening to attain a still better homogeneous distribution of the shortening in the powdered ingredients. This after-treatment may be effected by tumbling the dry mix in a granulator or in any other type of rotating container. The desired effect may also be attained with the aid of one or several vibrating screens. The use of an inclined and/or conical drum open at both ends wherein the dry mix is advanced longitudinally during tumbling has proved to be particularly advantageous for this purpose. By changing the degree of inclination or the angle of the conical divergence and by changing the speed of rotation, the residence time of the dry mix in the drum and thus the granulating action may be controlled. In this way the texture of the dry mix may be varied from a flour-like consistency to a granular consistency.

In conjunction with the use of this type of drum, it is further advantageous to continuously scrape off the particles of shortening, powdered components and dry mix clinging to the inner wall of the drum with the aid of a brush.

Instead of subjecting the dry mix to an after-treatment as described above, the particles of dry mix may also be treated in an air classifier after they emerge from the shortening spray zone; the relatively light-weight particles separated thereby may be sprayed once more with atomized shortening. Likewise, the finished dry mix in its entirety may be sprayed with atomized shortening a second time. According to an especially advantageous embodiment of the process of the invention, the free gravitational fall of the mixture of powdered ingredients is slowed down by a stream of gas flowing upwardly in opposite direction to the descenting particles of powdered ingredients. However, this gas stream is not, as in the known fluidized bed process, so strong that the particles of powdered ingredients remain in continuous fluidized motion; instead, the particles respond to the gravitational force with a certain delayed action. In this manner the individual particles are exposed to the spray of shortening for a longer period of time, and in many cases an after-treatment or air classification of the dry mix, as described above, becomes superfluous.

Referring now to the drawings, FIG. 1 is a schematic side elevation of an apparatus which may be utilized for the embodiment of the process according to the invention involving the spraying of the freely falling powdered ingredients with atomized shortening and for the subsequent treatment of the dry mix by tumbling. This apparatus is also suitable for the continuous preparation of smaller quantities of dry mix for test purposes. The mixture of powdered ingredients is placed into hopper 1. It is advantageous to keep the powder in loosely packed condition by blowing air into the bottom of hopper 1 by means of jets (not shown in the drawing). The mixture of powdered ingredients travels through metering screw 2 and vibrating trough 3 into funnel 4 which imparts a convex shape to the freely falling shower of powder. Thus the freely falling shower of powder is adapted in shape and density to the spray of shortening, and an optimum admixture of the powdered and liquid components is achieved. The shortening is sprayed into the falling shower of powder with the aid of atomizing nozzle 5, to which it is carried from storage vessel 7 through metering pump 6. Vessel 7 is maintained by means of a thermostat at a temperature a few degrees above the melting point of the shortening. The discrete particles of dry mix formed by the collision of atomized shortening and falling powder fall into conical drum 8 which is slowly rotated about its longitudinal axis by means of motor 21, belt 22 and gear 23. The conical shape of the drum conforms to the angle of divergence of the spray of shortening in such a way that no particle of shortening traveling at a substantial velocity will strike the wall of the drum. When the shortening is sprayed into the freely falling shower of powdered ingredients, an envelope of powdered mixture is formed around most of the shortening droplets, thereby forming discrete particles of dry mix. Due to their greater weight, the resulting particles of dry mix drop onto the wall of the drum over a shorter flight path than residual particles of powdered ingredients not contacted by the spray of shortening. The rotation of the inclined drum causes the particles of dry mix comprising shortening to roll through the shortening-free particles of powdered ingredients and bind these. The crystallization of the shortening which has begun in the meantime causes the particles of dry mix to congeal and drop over the lower edge of the rotating drum into receiving vessel 9. Particles adhering to the wall of the drum are continuously removed by means of brush 10 which is stationary with respect to drum 8. In a larger version of this apparatus, the mixture of powdered ingredients may be fed into the spray of shortening through a correspondingly larger vibrating screen instead of through vibrating trough 3.

Figure 2:
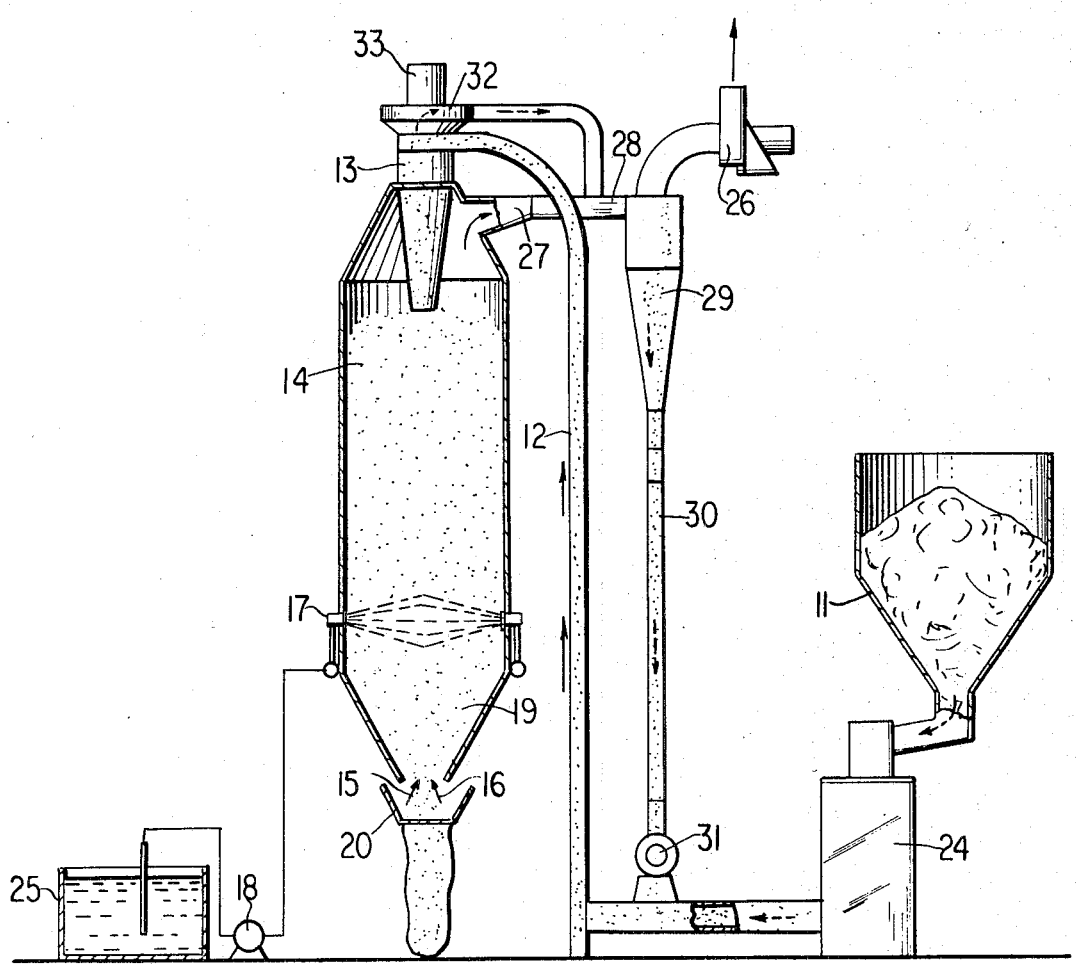

FIG. 2 is a schematic side elevation of an apparatus in which the gravitational fall of the mixture of powdered ingredients is retarded by an upwardly flowing air current and the particles of dry mix leaving the shortening spray zone are subjected to air classification; the light-weight particles being returned to the shortening spray zone, while the heavier particles are collected at the bottom.

From hopper 11 the mixture of powdered ingredients travels through pneumatic feeder 24 and feed line 12 into cyclone precipitator 13 from which the powdered ingredients are tangentially blown into the cylindrical tower 14 and thereby distributed over the entire cross section of the tower. Air sucked in from the bottom of the tower by means of fan 26 flows upwardly toward the falling powder; the air is admitted through annular openings 15 and 16. The upward velocity of the air current is adjusted so that the particles of powdered ingredients drop slowly in the cylindrical portion of the tower 14. The melted shortening is pumped from thermostatically heated container 25 by means of metering pump 18 to two diametrically oppositely located atomizing nozzles 17. The spray of melted shortening is directed toward the interior of the tower. More than two atomizing nozzles may be employed; however, in that case the circumferential distance between the nozzles must be sufficiently great to prevent fusion of the shortening droplets into larger drops. After passing through the spray of atomized shortening, the particles of dry mix and particles of powdered ingredients not contacted by droplets of shortening pass into the lower conical portion 19 of the tower. Due to the tapering of the tower at this point, the upward velocity of the air current becomes so large that particles of powdered ingredients and relatively light-weight particles of dry mix are returned upward into the spray of atomized shortening. Relatively heavy particles of dry mix, on the other hand, drop into funnel 20 and are conveyed from there to a packaging device.

Some of the particles of powdered ingredients introduced into tower 14 are entrained by the upwardly moving current of air and leave the tower through vent 27, pass through line 28 into another cyclone precipitator 29, whence they are returned to the powdered ingredients feed line 12 through line 30 and separator 31. Sifter 32 driven by electric motor 33 returns those particles which do not reach precipitator 13 to precipitator 29.

It was found that when this type of apparatus is used for the preparation of the dry mix, an after-treatment of the character described above becomes superfluous. The size of the particles of dry mix issuing at the bottom may be controlled by varying the speed of the upwardly flowing air current as well as by varying the type of atomizing nozzles or by varying the size of the droplets of atomized shortening. The apparatus shown in FIG. 2 is particularly suitable for continuous preparation of large quantities of dry culinary mixes.

With the aid of the process of the invention and the apparatus shown in FIGS. 1 and 2 of the drawings, dry culinary mixes may be prepared which do not tend to decompose or to cake, even if they contain a relatively high proportion of shortening having a low melting point. These dry culinary mixes contain all of the ingredients necessary for baking, so that for the preparation of the dough or batter only some edible aqueous liquid, such as water or milk or, if desired, a fresh egg has to be added. Of course, the ultimate consumer may add other ingredients to suit the individual taste, such as raisins, almonds, citronate, nuts, and the like. The individual ingredients of the dry culinary mixes prepared according to the present invention can be balanced in relation to each other, so that a large number of various kinds of baked goods can be prepared from one dough.

The dry culinary mixes prepared according to the process of the invention have a uniform texture. Even with a high shortening content of 20% by weight or more, the dry mixes are dry and do not give up shortening to the absorbent base in the test described above. Since the raw materials and finished products are not subjected to any grinding or kneading force and are supported predominantly by an air stream, the dry mixes are fluffy and enriched with air. This feature has a very favorable effect on the dough and the baked goods prepared from this dough. The shortening has a degree of distribution and a crystalline structure which otherwise is obtainable only by prolonged kneading with a subsequent period of standing in the case of pastry dough or, in the case of cake batter, only after a very long time of beating.

The very fine distribution of the shortening and the uniform coverage of the shortening particles by the powdered ingredients produce very satisfactory storage properties of the dry mix. In storage tests it has been established that, even without the addition of preservatives, neither rancidity nor loss of flavor occurred after a storage period of up to six months in appropriate packages. On the contrary, the baked goods prepared from the dry culinary mixes used in these storage tests proved to be fresh and perfect in regard to taste.

The dry mixes obtained by the process of the present invention are stable within wide limits against the effects of cold and heat as well as against shocks or vibrations such as occur during shipment.

The following examples further illustrate the invention. It should be understood, however, that the invention is not limited to these particular examples. The percentages are by weight, based on the total weight of the dry mix.

EXAMPLE 1

In a laboratory apparatus constructed as shown in FIG. 1, 40 kg. per hour of a finely powdered mixture consisting of:

| | Percent |
|---|---|
| Light wheat flour | 50 |
| Corn starch | 15 |
| Confectioner's sugar | 12.5 |
| Crystalline sugar | 12.5 |
| Baking powder | 1.25 |
| Powdered whole eggs | 3.375 |
| Powdered skim milk | 3.375 |
| Salt | 0.15 |
| Flavoring | 1.85 | were passed from hopper 1 over vibrating trough 3 into funnel 4. While falling freely out of the funnel, the mixture was sprayed with 10 kg. per hour of melted hydrogenated peanut oil atomized from nozzle 5. The resulting particles of dry mix dropped into the conical drum 8 which was 120 cm. long, rotated at 20 r.p.m. and had a divergent angle of 20°. The diameter of the drum was 40 cm. at the narrow end and 80 cm. at the larger end. The particles of dry mix were granulated while rolling over the inner wall of the drum and formed discrete granules of dry mix of uniform size which were collected in receiving vessel 9.

400 gm. of the granular dry mix obtained in this manner were admixed with 60 ml. of milk and then kneaded in an electric mixer for just two minutes. A ready-to-bake dough for sweet pastry was obtained. In another test, an analogous mixture of dry mix and milk was kneaded by hand. In this case, too, a ready-to-bake dough was obtained in less than two minutes. In both cases the dough could immediately be rolled out to a thin, cohesive sheet, that is, without observing the period of standing usually required for pastry dough prepared by simply admixing the individual ingredients.

In the same manner a dry mix for a dough for salty baked products was prepared from the following ingredients.

| | Percent |
|---|---|
| Hydrogenated peanut oil | 20 |
| Wheat flour | 51 |
| Corn starch | 24.5 |
| Baking powder | 1 |
| Powdered whole eggs | 1 |
| Powdered skim milk | 1.5 |
| Salt | 0.5 |
| Flavoring | 0.5 |

400 gm. of this dry mix, together with 125 ml. of milk, were kneaded into a ready-to-bake dough in less than two minutes, resulting in a plastic, easily rollable dough.

EXAMPLE 2

In an apparatus constructed as shown in FIG. 2, two tons per hour of a dry culinary mix were prepared from the following powdered ingredients:

| | Percent |
|---|---|
| Hydrogenated peanut oil | 20 |
| Wheat flour | 38 |
| Corn starch | 12 |
| Confectioner's sugar | 12.5 |
| Crystalline sugar | 12.5 |
| Baking powder | 1.8 |
| Powdered whole eggs | 1.0 |
| Powdered skim milk | 1.5 |
| Salt | 0.15 |
| Flavoring | 0.55 |

1.6 tons per hour of the mixture of the powdered shortening-free ingredients were tangentially blown into the cylindrical tower 14 through the precipitator 13. The tower 14 had a height of 6.5 meters and in its center part had a diameter of 1.5 meters. By means of two oppositely located atomizing nozzles 17 with a diameter of 2 mm., 0.4 ton per hour of melted hydrogenated peanut oil was sprayed into the descending mixture of powdered ingredients. The temperature of the air current sucked upwardly through the tower was maintained at between 6 and 18° C.

500 kg. of the dry culinary mix obtained in this manner were stirred in batches of 15 kg. each with four and a half liters of milk into a viscous, cohesive batter in only ten seconds with the aid of a conventional baker's mixer, also adding chopped nuts and raisins. Thereafter, the batter was poured into cake pans and baked.

Using the method described above, cakes of excellent quality may be prepared in the shortest time in large quantites, which is of importance to kitchens in industrial plants, hospitals, hotels and restaurants, especially summer restaurants, where the demand for such baked products fluctuates widely.

While the present invention has been illustrated with the aid of certain specific embodiments, it will be readily apparent to those skilled in the art that the invention is not limited to those particular embodiments and that various changes and modifications may be made without departing from the spirit of the invention or the scope of the appended claims.

We claim:
1. The method of preparing a dry culinary mix having ingredients including shortening and dry powdered components comprising a major amount of flour in proportions to form an edible culinary product when said mix is mixed with an aqueous edible liquid and baked, which comprises spraying a single time finely divided melted shortening having a melting point between 30 and 35° C. in an amount from 5 to 30% by weight, based on the total weight of the said dry culinary mix into a free falling shower of a mixture of said dry powdered components, whereby said dry powdered components envelope individual droplets of shortening and form discrete particles of dry culinary mix, and granulating said discrete particles of culinary mix in the said dry powdered components.

2. The method according to claim 1, wherein the dry powdered components include from 10 to 30% by weight of starch, based on the total weight of said dry culinary mix.

3. The method according to claim 1, wherein the dry powdered components include sugar, of which 30 to 60% by weight is confectioner's sugar and the remainder is fine crystalline sugar.

4. The method of preparing a dry culinary mix having ingredients including shortening and dry powdered components comprising a major amount of flour in proportions to form an edible culinary product when said mix is mixed with an edible aqueous liquid and baked, which comprises spraying a single time finely divided melted shortening having a melting point between 30 and 35° C. in an amount from 5 to 30% by weight, based on the total weight of the said dry culinary mix into a shower of falling particles of a mixture of said dry powdered components while passing a gas in countercurrent fashion through said shower of falling particles to reduce their rate of descent.

5. The method of preparing a dry culinary mix having ingredients including shortening and dry powdered components comprising a major amount of flour in proportions to form an edible culinary product when said mix is mixed with an edible aqueous liquid and baked, which comprises spraying finely divided melted shortening having a melting point between 30 and 35° C. in an amount from 5 to 30% by weight, based on the total weight of the said dry culinary mix into a free falling shower of particles of a mixture of said dry powdered components, whereby said dry powdered component envelop individual droplets of shortening and form discrete particles of dry culinary mix of varying weight, subjecting said discrete particles of culinary mix to air classification to separate relatively light particles from relatively heavy particles, returning the relatively light particles to the shortening spray to convert them into relatively heavy particles of culinary mix, and collecting said relatively heavy particles of culinary mix.

6. A dry culinary mix having ingredients including shortening and dry powdered components comprising a major amount of flour in proportions to form an edible culinary product when said mix is mixed with an aqueous edible liquid and baked, prepared by spraying a single time finely divided melted shortening having a melting point between 30 and 35° C. in an amount from 5 to 30% by weight, based on the total weight of the said dry culinary mix into a free falling shower of a mixture of said dry powdered components.

References Cited

UNITED STATES PATENTS

| 1,242,883 | 10/1917 | Kohman et al. | 99—94 |
| 2,791,506 | 5/1957 | Callaghan et al. | 99—94 |
| 2,835,588 | 5/1958 | Alexander et al. | 99—94 |
| 3,037,864 | 6/1962 | Bedenk | 99—94 |
| 3,039,878 | 6/1962 | Ganske | 99—94 |

RAYMOND N. JONES, Primary Examiner